Dec. 1, 1942.   W. J. MILLER   2,303,887
METHOD AND APPARATUS FOR THE MANUFACTURE OF POTTERY WARE
Filed May 24, 1938   3 Sheets-Sheet 1
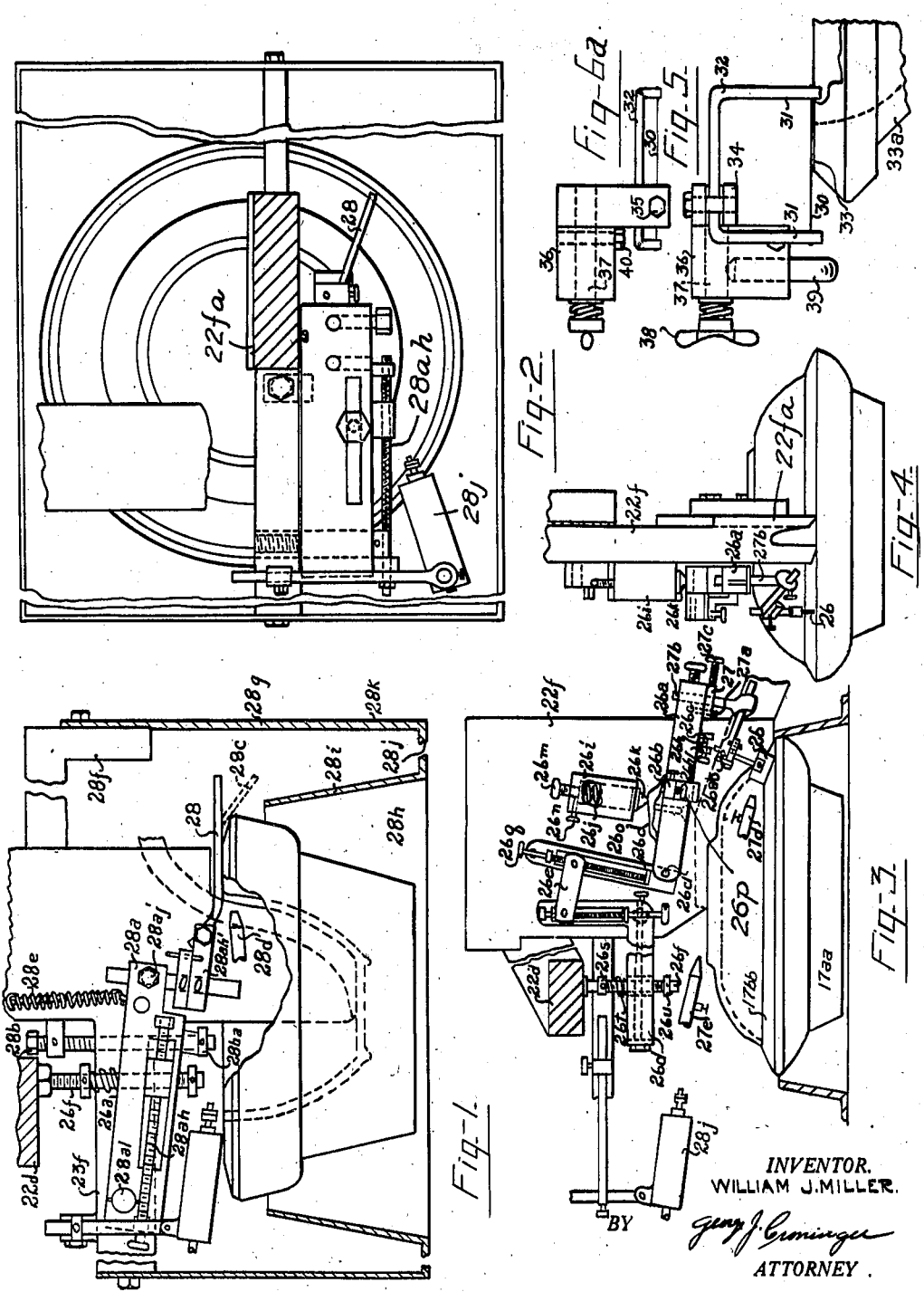
INVENTOR.
WILLIAM J. MILLER.
BY
ATTORNEY.

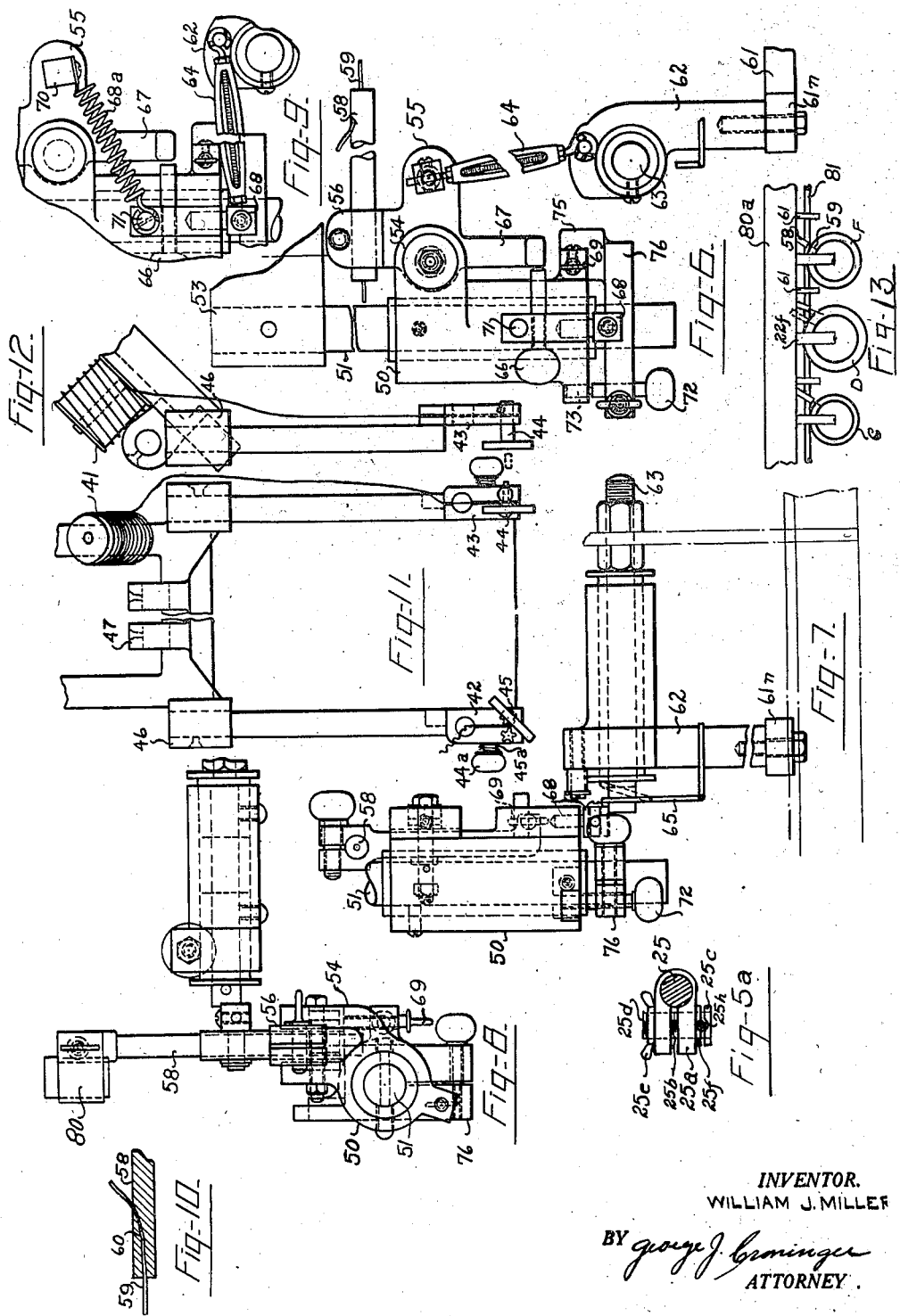

Dec. 1, 1942.  W. J. MILLER  2,303,887
METHOD AND APPARATUS FOR THE MANUFACTURE OF POTTERY WARE
Filed May 24, 1938  3 Sheets-Sheet 3

Inventor:
WILLIAM J. MILLER
By
George J. Aminger
Attorney.

Patented Dec. 1, 1942

2,303,887

UNITED STATES PATENT OFFICE 2,303,887

METHOD AND APPARATUS FOR THE MANUFACTURE OF POTTERY WARE

William J. Miller, Swissvale, Pa.

Application May 24, 1938, Serial No. 209,667

38 Claims. (Cl. 25—26)

This invention relates to methods and apparatus for the manufacture of pottery ware. This application is a continuation as to all divisible subject matter of my co-pending application for United States Letters Patent, Serial No. 29,886, now Patent #2,148,871.

This invention has to do with improvements in and for trimming, an operation in the manufacture of jiggered potteryware which occurs incident to the profiling step and is for the purpose of removing excess or accumulated clay or scrap from the brim zone of the mold. The trimming operation occurs whilst the clay is in a plastic state and coincident with or just following the profiling operation and prior to drying as distinguished from subsequent tooling operations which are performed upon the dried body preparatory to dipping and firing.

The objects of this invention are to provide for the improvement of trimming provisions utilized in connection with mechanical or automatic forming, viz: jiggering to provide for the automatic functioning of the trimmer during the ware making cycle; to provide for the variation, either when at rest or in operation, of the instant of application or recession, and the angle and extent of approach of the trimming instrumentality to the surface of the mold and the pressure involved in the trimming operations; to provide for the quick interchange and adjustment of the trimming facilities as in the case of changing from one type of ware (mold) to another, for instance flatware to hollow ware and to provide an apparatus capable of being used for trimming ware of either classification; to provide for the quick replacement of broken trimming instrumentalities; to provide a self locating trimmer which automatically adjusts itself to the proper working level with relation to the brim of the mold, to minimize wear and tear on the trimming instrumentality by avoiding unnecessary and uncontrolled application to the work; to improve the quality of the ware by minimizing the possibility of developing strains, etc. in the trimmed surface, for instance, cup brims, from faulty application or adjustment and to prevent damage to the molds from scraping or cutting.

This invention contemplates both blade and wire trimming provisions adapted for the trimming of all classes of round jiggered potteryware customarily made on automatic jiggering machinery, viz: hollow ware and flatware. One embodiment of the invention comprehends a trimmer assembly adaptable to either flatware or hollow ware operations with provisions for moving the same into and out of engagement with the work incident to each cycle; the invention also comprehends the locating of the trimming instrumentality at the proper working level in response to co-operation of the trimmer with the work, this self adjustable feature being extremely advantageous in avoiding damage to the molds and trimmer together with provisions for insuring that the proper pressure is applied to complete the work in satisfactory fashion.

In the drawings:

Fig. 1 is an elevation of a trimming unit adapted for trimming hollow ware molds.

Fig. 2 is a top plan view of the apparatus shown in Fig. 1.

Fig. 3 is an elevation of a trimming unit for flatware.

Fig. 4 is a side elevation of the arrangement shown in Fig. 3.

Fig. 5 is an elevation of a clevis type trimmer arranged for trimming hollow ware.

Fig. 5a is an elevation of a wire holder.

Fig. 6 is a side elevation of a wire trimmer arrangement with actuating means therefor.

Fig. 6a is a top plan view trimmer shown in Fig. 5.

Fig. 7 is a front elevation of the arrangement of Fig. 6.

Fig. 8 is a top plan view of the arrangement of Figs. 6 and 7.

Fig. 9 is a fragmentary detail illustrating the relocation of driving connections in converting the trimmer of Fig. 6 from hollow ware to flatware.

Fig. 10 is a fragmentary detail in section showing the trimmer wire support of Fig. 6.

Fig. 11 is an elevation of a wire trimmer provided with the continuous feed.

Fig. 12 is a side elevation of the apparatus shown in Fig. 11.

Fig. 13 is a fragmentary detail showing how a diverse production would be trimmed.

Figure 14:
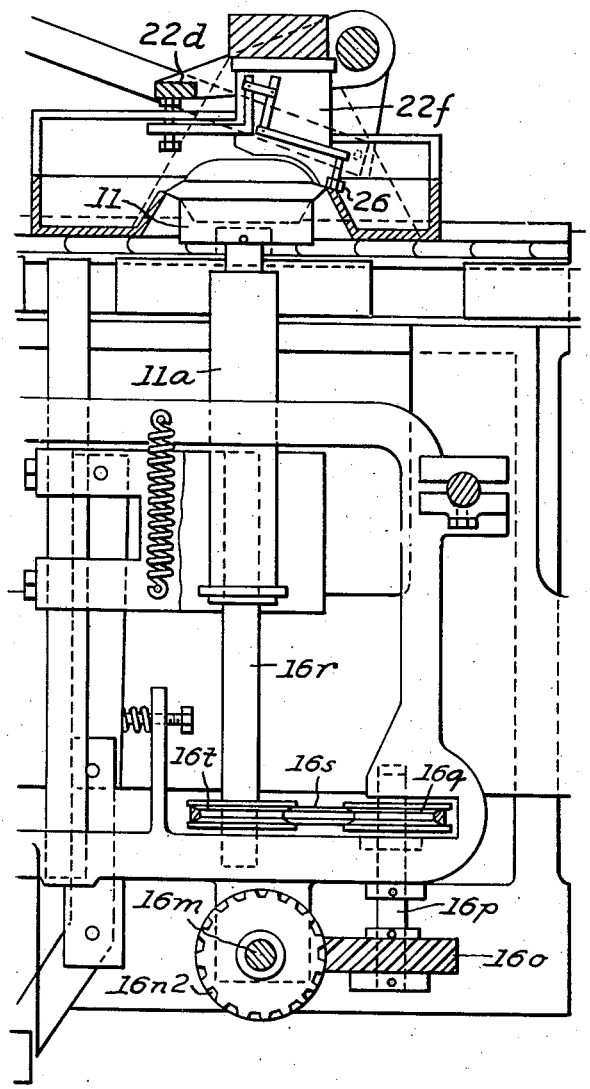
Fig. 14 is a side elevation of the jiggering mechanism illustrating the mold chuck and means for rotating the same.

In the manufacture of jiggered potteryware, after the ware is profiled, the clay is trimmed from the brim and exposed portions of the mold which during the profiling operation have become coated with clay.

With reference to Figs. 3 and 4, I have shown an arrangement wherein a trimmer blade 26 is secured to an operating pitman 26a through the medium of a universal clamp 26ab and is retained in lateral position by a bracket 26b. The pitman 26a is pivoted at its far end to a lever 26c, pivoted at 26cl which in turn is connected to a bell crank 26d by the link 26e, the bell crank 26d being provided in its horizontal portion with a stud 26f which contacts with a bar 22d. A lug 26g projects from the pitman 26a and contacts with a screw 26h threaded into a projection 26hl of the frame 22f to thereby adjustably limit the advance of the trimmer blade 26 towards the edge of the ware. A housing 26i projects from the frame 22f and is bored to house a spring 26j and a plunger 26k. The spring tension is adjustable through a screw 26m and detent 26n and the plunger resiliently contacts with a cam 26o secured to the pitman 26a, its upper surface being contoured to suit. The lever 26c and the vertical portion of the bell crank 26d are provided with screw studs 26q carrying movable pivot blocks to which is pivoted the link 26e and whereby the vertical position of the link may be adjusted and thereby adjust the horizontal travel of the pitman 26a while in operation. The screw 26f is provided with an adjustable collar 26s, a spring 26t and an adjustable collar 26u. The collar 26s adjusts the tension of the spring 26t and the collar 26u determines the vertical position of the head of the screw 26f. By adjusting the collar 26u upwards, a gap is provided between bar 22d and screw head 26f across which the bar 22d must travel before contacting with the screw and consequently delays the advance of the trimmer 26 and also reduces its extent of travel forward. Then by adjusting the link 26e downward, the extent of travel may be restored and its speed of travel is increased. By adjusting the link downward as before, and maintaining the collar 26u in its present position, the trimmer is caused to function earlier, the spring 26t compressing on final depression of bar 22d due to the screw 26h limiting the advance of pitman 26a and this also increases the dwell of the trimmer 26 in advanced position. This provides for operating a multiple of trimmers off a reciprocating bar having uniform travel throughout and enabling the operator to obtain variations in speed of trimmer, dwell in advanced position, instant of advance and maximum pressure applied to advance the trimmer. Through the medium of the housing 26i and cam 26o, pressure of the trimmer 26 against the mold surface may be adjusted and the contour of the cam 26o provides for varying the pressure of the trimmer blade on the mold at any point during its travel. To provide against derangement of the trimmer 26 from nicked or defective mold brims and to properly start the trimmer over the edge of the brim of the mold, I provide the cam 26o with a lower or under side contoured surface which may be to a different contour than the upper portion and which bears against a screw 26p and limits the lowermost position of the blade 26. To provide for quick replacement of trimmers 26, a dog 27 having a dowel 27a secured in one end is clamped to a stem 27b by a screw 27c, thus providing for the removing of the stem 27b and trimmer 26 as a unit and replacing it with another unit which has previously been set correctly on a dummy or duplicate unit away from the machine, or replacing the same unit in exact position it occupied before removal, thereby greatly reducing the time otherwise necessary replacing a trimmer and adjusting it carefully. The universal mounting of the trimmer facilitates the setting of the blade 26 to any desired angle both vertically and horizontally, and also its position horizontally on the mold and also its degree of tangential travel on the mold. To insure against adhesion of the clay on the trimmer 26, I prefer to advance the trimmer rather rapidly to thereby increase the size and weight of the trimmings which renders them less liable to adhere to the blade due to momentum they possess. To still further insure against adhesion and to direct the trimmings to a predetermined point of deposit, lest such trimmings fly or be deflected onto the surface of the freshly formed ware or accumulate on the gear and fly back onto the ware surface, I provide a nozzle member 27d, controlled by valves such as shown in Figs. 2 and 3, adjacent the profile and adjustably secured in position by the universal clamp heretofore described. During the trimming operation, this nozzle 27d directs a jet of air against the trimmings to propel them to a definite point of deposit and prevent adhesion to the blade 26. An air nozzle 27e, similarly controlled and mounted, is directed against the ware to remove or uniformly distribute excess water or slurry over the surface of the ware.

The ware is made on the mold 17aa by the profile 22fa and water application incident to fabrication is controlled by jet 28j. In the present instance, the blade 26 is set to trim the marginal, or brim, zone 17bb of the mold on the molding surface side, the brim being inclined toward the verge. The working edge of the blade 26 is set at an angle corresponding with the face of the brim 17bb and incident to each cycle of the machine is moved into and out of the working zone. It is understood that many different classes of flatware may be trimmed with the arrangement shown from small ware requiring molds of 6" or 7" in diameter to very large ware made over 12" to 14" molds. The trimmer therefore not only has a wide range of adjustment to accommodate molds of larger or smaller diameter but may be adjusted to move in quicker or retract at a higher rate of speed, depending on the length of time which it takes to make the piece, or in other words, the speed of operation of the machine. Small ware ranging in size from 4" to 6" plates, saucers, etc. are made at the speed of 15 to 24 per minute which allows a very small increment of time for the trimmer to do its work once the profiling operation is started. This is one reason for moving the trimmer in quickly once the time for action occurs. The mold, in the case of small ware, rotates at a very high R. P. M. so that the interval the trimmer remains at the working position may be in this instance very short. Large ware, which is more difficult to jigger and requires a greater length of time to profile and normally is rotated at slower speeds than small ware, is produced automatically at speeds of from 8 to 15 per minute, depending on the diameter. Thus the dwell of the trimmer, because of the larger amount of work it has to do, will be greater than in making small ware, but the advance and retraction of the blade may be at a speed equal to the travel in making small ware. Thus, with the provisions herein specified, the trimmer is adapted for substantially all regular circular flatware shapes.

When making cups, etc., the structure as shown in Figs. 1 and 2 is employed. In this case, the trimming operation however is somewhat different. The top surface of the mold is preferably convex shape and a wire 28 is secured by a universal joint to an operating lever 28a. A screw 26f mounted and functioning similar to that shown in Fig. 3 transmits motion from the bar 22d to the lever 28a, which is pivotally secured at 28al to the profile frame 22f through an extension 23f. A screw 28b provided with collar 28ba, limits the lowermost travel of lever 28a. The wire trimmer 28 is flexible and is mounted so that at first contact with the mold, it is in the position shown at 28c and when depressed to maximum position it is as at 28, intermediate of these two positions, it follows the contour of the mold top having point contact only so that on initial contact, it cleans the outer edge of the mold and progressively follows to the bore, then when being elevated this is repeated in reverse. In this type of trimmer, it is of greater importance to depress the trimmer rapidly to thereby remove large portions of excess clay at one time so as to prevent adhesion of the clay to the wire 28 and also prevent throwing of fine chips or shavings of clay into the mold interior. The screw structure 26f heretofore more fully explained serves to control the speed of trimmer application on cups independent of that employed in making plates. An air jet 28d, mounted on a universal joint, aids and insures dislodgment of trimmings and directs their deposition. The trimmer is elevated by means of spring 28e. The profile frame 22f is provided with brackets 23f and 28f to which is secured waste material spill pan or guard 28g provided with a bore 28h and an upwardly extending cone 28i whose upper bore is slightly larger than the mold and this cone is for the purpose of preventing waste material from falling down into the mechanism beneath the mold and enabling the accumulation of a large quantity of waste material in the pan to thus provide for less frequent removal. The pan is provided with a floor 28j' and an outer wall 28k, the outer wall acting as a splash guard to prevent the throwing of waste material onto adjacent molds and confines it within a definite area.

As in the case of flatware, the present trimming arrangements are adaptable to various size of molds from small cup or bowl molds, to say for instance, large casserole molds. The working position of the trimmer may be moved closer to or away from the center of the mold by rotating screw 28ah which causes the frame 26a to feed in one direction or the other. Where the mold is not of standard height or does not rise to the extent shown on the drawings, the trimmer may be lowered by loosening stud 28aj, the end of the holder being formed as a split clamp. The trimmer wire is received at one end in a clamp 28ah' which enables quick replacement and lengthwise adjustment also of the individual wire.

Fig. 5a shows a universal adjustment clamp. A securing stem 25 has a snug fit in the bore of the split clamp 25a which is bored at right angles for insertion of a stud 25b having a head 25c at one end and a threaded portion 25d at the other in engagement with nut 25e, a washer 25f loosely encircles the stud 25b which has a bore through which a tube 25h or rod may be projected. When the nut 25e is loosened, it simultaneously loosens rod 25h and 25 so that the rod or tube 25h may be swung around in any position besides being moved along the bar 25 to change the location. This type of clamp provides for quick adjustment of the spray nozzles and various tools herein described.

The trimmer of Fig. 1 which has been designated as a wire is supported at one end only, however, it is equally advantageous to support the wire at both ends and I have shown this arrangement in Fig. 5 wherein the wire 30 is suspended in tension between the legs 31 of a clevis 32. The clevis is sufficiently wide to span, when in proper position, the brim 33 of the mold 33a with the outside leg depending into the molding cavity. The width of the clevis may of course vary within practical limits and the legs are slotted to receive the tipped wire ends. This arrangement facilitates a replacement of broken wires inasmuch as the legs can be grasped in the hand and sprung inwardly whilst the wire is inserted.

In mounting the clevis on the machine I provide a split clamp 34 in which the clevis is frictionally secured, in off center position, in a necked portion of the clamp which has a stud 35 for tightening purposes. Clamp 34 is attached to another split clamp 36 by means of a stud 37 and spring pressed thumb nut 38 and is mounted on a post 39 attached to the frame of the jiggering machine (not shown) or to pitman 28a or 26a. This clamp is adjustable vertically and rotationally to various positions, thereby affording heightwise and tangential adjustment of the trimmer relative to the mold, and may be locked by screw 40.

This type of trimmer is self positioning as respects the working level of the trimmer wire. In setting the device, it is located heightwise angularly in as nearly correct position as possible before the mold is brought up to maximum elevation and as the mold engages the trimmer wire it causes the clevis to turn in the clamp (the frictional engagement in the clevis and clamp is sufficient to hold the clevis in position yet permit the same to turn as the mold elevates) which raises the wire to the correct elevation for this and all succeeding molds in the set. The clevis is of course set at a slight angle (Fig. 5) to start with and not on dead center, however, should the clevis be on dead center no harm would ensue because the entire clamp 34 would be raised.

This type of trimmer may be used also with flatware molds having sloping brims, either by locating the bracket 39 on the machine frame at an angle or constructing the clamp itself so as to provide the desired angularity.

In Figs. 11 and 12 is shown a clevis type trimmer strung with a continuous length of wire fed from spool 41. The wire is strung between split spring clamps 42 and 43 across the open end of the clevis and passes between rolls 44 and cogs 45, the latter having a key for turning same to thus progress the wire. In case a corrugated wire is desired, the wire may be reversely strung or the position of the rolls 44 and cogs 45 reversed. Clamps 42 and 43 provide varying tension on the wire by means of thumb screws 44a and springs 45a and being split enable accommodation of wire of different gauge. The object is to feed a new length of wire across the open end of the trimmer before the used length wears thin and breaks, however, restringing can be easily accomplished by simply loosening the clamps and drawing the wire through the guide slots.

The legs of the clevis are in the form of rods which are vertically slidable in bosses 46 thereby enabling variation in the effective depth of the clevis. Also, a mounting such as that shown in Fig. 5 may be provided except that a rod would be held in clamp 34 on which the clevis would be mounted by ears 47, thus providing for heightwise and angular adjustment as respects the mold.

This clevis type trimmer, as in the case of that shown in Fig. 11, may be adopted for flatware operations as described. Furthermore, if desired, individual clevis members for particular classes of work may be provided, the only difference being in dimensions and not in fundamental characteristics or constructional features.

In Figs. 6, 7, 8 and 9, I have shown a trimmer arrangement adaptable for both flatware and hollow ware which comprises a bushing 50 which is bored and mounted on a rod 51 suspended from the lintel 53 of the machine adjacent the profile (not shown). The ears 54 rotatably support a frame 55 comprising a split clamp 56 in which a holder 58 for the trimmer wire 59 is slidably positioned. This holder is in the form of a length of rod stock having a bore 60 at each end opening into the circumferential surface of the rod at a point spaced inwardly from the ends, thereby forming a conduit in which the trimming wire is inserted and allowed to project beyond the ends of the openings. If desired, the bores may be made on a radius to provide for frictional securing engagement between the wire and wall of the bore or a plug may be inserted to hold the same. As the wire wears the shortened length can be extended by feeding more wire into the conduit and since trimmers are arranged at each end of the rod, it may be reversed to facilitate reloading without appreciable loss of time.

The trimmer is vertically reciprocated to move the wire into and out of engagement with the work by means of a cam 61 which actuates an arm 62 mounted on shaft 63, Fig. 7, between which a connection is had with the mounting 55 by turnbuckle 64. The cam follower is returned by spring 65. The extent of reciprocation is controlled by adjustable stop (thumb screw) 66 which engages with a stop 67. Thus far, the trimmer as described is adapted for trimming hollow ware.

In case it is desired to trim flatware, the turnbuckle 64 is disconnected from the mounting 55 and connected to the pin 68 on the base of the sleeve 50. Thus, when arm 62 is oscillated the sleeve 50 is rotated about a vertical axis (rod 51) thus causing the trimmer wire to move in a horizontal, rather than a vertical, arc into and out of working position. The angle of inclination and vertically lowermost position of the trimmer can be controlled by the adjustment of thumb screws 66 and to provide for a resilient engagement of the wire with the mold, a spring 68a is connected, Fig. 9, between the pivot block 70 and a pin 71 located on the side of the sleeve. Thus, the level at which the trimmer wire operates is variable depending on the mold and is automatically adjustable to accommodate variations in mold brim height.

Before the sleeve 50 can be rotated however, it is necessary to drop the indexing pin 72 out of the hole 73 in the bottom of the sleeve. This normally holds the sleeve against rotation when the trimmer is operating on hollow ware.

The range of movement of the trimmer is controlled for flatware by the stop member 69, Fig. 8, which strikes an abutment 75 on the split clamp member 76. The entire assembly may be raised or lowered by unloosening the clamp 76 and shifting the same up or down.

There are various holders which may be employed in this type of trimming device such as for instance the one shown in Fig. 8. This is an extension device which has a split clamping member 80 in which the holder 58 may be mounted.

In the case of any of the reciprocating or rotating trimmers disclosed herein, the same may be operated from other parts of the machine than the cam 61 shown or bar 22d as long as the movement thereof is timed correctly with the operation cycle.

With reference to Fig. 6, the turnbuckle 64 may also be replaced by a spring such as that shown at 68a in making a drive connection between the pivot block 70 and the arm 62. This would provide for a resilient application of the trimmer wire to the work, the setting of lowest position then being through screw 66, and would also enable the wire to follow any irregularities in the brim surface of the mold without cutting or scratching the same.

In connection with the wire utilized in the wire type trimming means, it is preferred that a metal or alloy which is highly abrasive resistant be employed, owing to the fact that the clay on which the wire operates has a high abrasive action. It has been found that in trimming the brims of cups or bowls and the like that a small gauge wire, such as for instance a wire of music wire gauge, operates with the best results in avoiding strains which normally would appear in the bisque ware as fine lip cracks. In some cases a heavier gauge wire may be utilized without detrimnetal effect, however, quite a lot depends on the class of ware being made and the consistency of the clay. Where an extremely fine wire is employed, it is desirable to support the same at both ends, whereas, in the case of stiffer wire the support need only be at one end.

With both the blade and wire type trimmers, it is possible to predetermine the angle of deflection of the clay trimmings thereby making it possible to direct the same into a place of deposit remote from the mold. If a strong blast of air is directed against the trimmer or toward the place of deposit at or about the zone where the trimmings are segregated, it will assist in propelling such trimmings thereto. Furthermore, a strong blast of air assists in keeping the trimmer blade clean and substantially prevents the possibility of trimmings falling onto or being thrown back onto the freshly formed ware.

In regard to Fig. 13, I have shown therein the profiling station of a multiple jiggering machine wherein a diverse production is undergoing profiling and trimming. The mold C may, for instance be for cups or hollow ware, the mold D for plates and the mold F for saucers or small plates. A profile 22f attached to lintel 80a is shown for each mold as well as a trimmer arrangement 58. These trimmers may or may not operate at the same instant depending on the ware being fabricated, as will be noted by a comparison of the positioning of the left and right hand trimmers which have reached the working position, and the central trimmer which is approaching the dotted line position. Each trimmer apparatus may be actuated by a cam 61 mounted on cam shaft 81 unless it is of the Fig. 5 type in which case a bracket 39 would be located adjacent each profile and the cams and cam shaft omitted. In either event, it is proposed that the range of operations of a trimmer associated with any one line of molds encompasses all of the classes of ware which it is possible to make in that line so that there will be no need for lengthy interruptions in replacing or changing our equipment or any need for carrying a plurality of spare trimming devices.

With reference to Fig. 14, there is shown therein apparatus for supporting and rotating molds at the fabricating position. This apparatus comprises a vertically reciprocable chuck 11 which is operative to pick up molds automatically out of the conveyor seats and transport them into operative adjacency to the profile mounted on the block 22f where said mold is rotated whilst the plastic ceramic material with which it is charged is formed into ware and the brim trimmed by trimmer tool 26.

This apparatus includes a main drive shaft 16m which has secured to it a gear 16n2 meshing with a gear 16o secured to shaft 16p to which is secured an adjustable sheave 16q which transmits motion to a spindle 16r through the medium of a V belt 16s and adjustable sheave 16t. The spindle 16r is in spline sliding engagement with the chuck spindle 11a and chuck 11. As the chuck is intermittently reciprocated, the chuck spindle 11a with the chuck 11 is caused to continuously rotate when the chuck is in elevated position and rest when in lowered position.

Having thus described my invention, what I claim is:

1. The process of making potteryware which comprises jiggering a clay charge on a porous mold, trimming the brim of the mold to remove adhering clay, and concurrently blowing the trimmings away from the mold and ware by a stream of air directed toward a place of collection removed from the mold.

2. In a machine for jiggering potteryware on porous molds, profiling mechanism comprising a profile tool, a brim trimming tool, means for automatically moving the trimming tool into and out of cooperation with the mold whilst the fabricating operation ensues, a support for said trimming tool, and means for adjustably securing the trimming tool to its support to permit variation of the angle of presentation of the trimming tool to the mold.

3. In an apparatus for fabricating diverse potteryware a plurality of fabricating units comprising jiggering frames, a plurality of brim trimming tools associated with said frames, separate actuating members for each brim trimming tool, means for varying the positional relationship of each trimming tool relative to the edge of the potteryware whereby each tool may be set to the individual requirements of the piece of ware being trimmed, and a common member driving all the actuating members.

4. In a machine for jiggering potteryware on porous molds, profiling mechanism comprising a profile tool, a brim trimming tool, means for adjusting the angle between said trimming tool and the periphery of the ware being profiled and the vertical and horizontal location of the trimming tool with respect to this periphery, and means for automatically advancing the trimming tool independently of the profile into co-operation with the mold and retracting the same therefrom.

5. In a pottery jiggering machine, profiling mechanism comprising a profile tool, a movable brim trimming tool, means for operating the trimming tool, and a connection between the operating means and the trimming tool permitting linear and rotary adjustment of said tool.

6. In a pottery jiggering machine changing a plurality of relatively rotatable profiles and mold chucks, a multiple of brim trimming tools and manipulating mechanisms therefor, a means common to all said mechanisms for transmitting motion thereto and means individual to each mechanism for varying the motion of each tool whilst in operation.

7. In apparatus for manufacturing pottery articles, the combination with a mold and a fabricating mechanism of a trimming means comprising a trimming instrumentality, a holder therefor and a support for said holder, said holder and said support being relatively adjustable, means for securing said holder in adjusted position, a mounting for said mounting, said support being vertically and rotatably adjustable and means for securing said support in adjusted position thereon whereby the position of said trimming tool circumferentially, radially and angularly of the edge of the ware may be varied.

8. In apparatus for manufacturing pottery articles, the combination with a mold and a fabricating mechanism of a support, a clevis member mounted on said support, a trimming instrumentality suspended between the legs of said support, said clevis member being rotatably adjustable in the said support and adapted to be positioned by engagement of the trimming instrumentality with the work.

9. In apparatus for trimming potteryware, a clevis member, means for securing a length of trimming wire across the open end of said clevis, a clamp for supporting said clevis member a bracket on which said clamp is mounted, said clamp being moveable relative to said bracket, a support for said bracket, said bracket being moveable relative to said support and means for securing said bracket to said support.

10. In apparatus for manufacturing potteryware, the combination with a mold and a fabricating mechanism of a trimming mechanism comprising a trimming instrumentality and a holder therefor, said holder being frictionally held in position but capable of being moved by engagement of the work with the trimmer to a position which it may occupy for successive trimming operations.

11. In the manufacture of jiggered pottery ware, the method which comprises, jiggering a plastic body of ceramic materials on the molding surface of a plaster pottery mold to form a piece of ware, trimming the brim of the ware and directing the trimmings away from the ware surface by directing a gaseous medium thereagainst, 12. In the manufacture of jiggered pottery ware, the method which comprises, jiggering a plastic body of ceramic materials on the contoured molding surface of a plaster mold to form a piece of ware, trimming the brim of the ware and directing the trimmings away from the mold and the ware surface by air under pressure.

13. In the manufacture of jiggered pottery ware, the method which comprises, jiggering a plastic body of ceramic materials on a plaster mold, bringing a trimmer into engagement with the brim of the body to remove excess material therefrom and define the rim of the product in the presence of a stream of fluid moving with sufficient velocity and in such direction as to prevent the trimmings falling back onto the surface of the mold or the surface of the freshly formed ware.

14. In the manufacture of jiggered pottery ware, the method which comprises, jiggering a plastic body of ceramic materials on the contoured molding surface of a plaster pottery mold to form a piece of ware, engaging the brim of the body with a trimmer to remove material from this zone and dislodging trimmings from the trimmer by air under pressure.

15. In the manufacture of jiggered pottery ware, the method which comprises, jiggering a plastic body of ceramic materials on the contoured molding surface of a plaster mold to form a piece of ware, engaging the brim of the body with a trimming tool, and influencing the direction of travel of the trimmings from the point of production thereof by moving a current of fluid thereagainst whilst in flight said trimmings being accumulated at a predetermined place of deposit beyond the surface of the ware.

16. In a pottery jiggering machine, a mold chuck, a plaster mold removably disposed in said chuck and adapted to be charged with plastic ceramic material from which the ware is fashioned, a profile tool for co-operation with said mold in the jiggering of the ware, means for relatively rotating the profile and chuck, means for trimming the brim of the material and fluid means associated therewith for directing the trimmings away from the surface of the freshly formed ware.

17. In a pottery jiggering machine, a rotatable mold chuck, a plaster mold removably disposed therein and adapted to be charged with plastic ceramic material from which the ware is fashioned, a profile tool for co-operation with said mold in jiggering the said ware, a trimming means adapted to engage the rim of the body of material for the purpose of removing excess therefrom and means for directing trimmings to a predetermined place of deposit comprising a moving stream of air and means for varying the direction of travel of said said moving stream of air.

18. In a pottery jiggering machine, a rotatable mold chuck, a plaster mold removably disposed therein and adapted to be charged with plastic ceramic material from which the ware piece is fabricated, a profile tool for co-operation with said mold in the jiggering of said ware, a trimming tool for trimming the brim of the material and means for dislodging trimmings from said tool comprising a jet of fluid directed against said trimming tool.

19. In a pottery jiggering machine, a rotatable chuck, a plaster mold removably disposed therein and adapted to be charged with plastic ceramic material, a profile tool for co-operation therewith for fashioning the ware, a trimmer for trimming the brim of the material, a support for said trimmer, means for actuating said support so as to move said trimmer toward and away from the brim of the work and means for varying the working stroke of the trimmer.

20. In a pottery jiggering machine, a rotatable chuck, a plaster mold removably disposed therein and adapted to be charged with plastic ceramic material, a profile tool for co-operation therewith for fashioning the ware, a trimmer for trimming the brim of the body, a support for said trimmer, means for reciprocating said support so as to move the trimmer into and out of engagement with the work and means for varying the point of commencement of the stroke relative to the brim of the mold.

21. In a pottery jiggering machine, a rotatable chuck, a plaster mold removably disposed in said chuck and adapted to support a charge of plastic ceramic material, a profile tool for co-operation with said mold for fashioning the ware, a trimmer for trimming the brim of the material, a support for said trimmer, means for actuating the support so as to move the tool into and out of engagement with the brim of the material and means for varying the closest approach of the trimmer to the axis of the mold chuck during the stroke.

22. In a pottery jiggering machine, a rotatable chuck, a plaster mold removably disposed in said chuck and adapted to be charged with plastic ceramic material from which the ware is fashioned, a profile tool for co-operation therewith, a trimmer, a support therefor, means for moving the support so as to move the trimmer into and out of engagement with the brim of the ware and adjustable means for predetermining the stroke of the trimmer.

23. In a pottery jiggering machine, a rotatable chuck, a plaster mold removably disposed therein and adapted to be charged with plastic ceramic material from which the ware is fashioned, a profile tool for co-operation with said mold in the jiggering of the aforesaid article of ware, a trimmer, a support therefor, means for actuating said support so as to move said trimmer toward and away from the brim of the ware and means for varying the speed of approach of the trimmer to the work.

24. In a pottery jiggering machine, a rotatable chuck, a plaster mold removably disposed therein and adapted to be charged with plastic ceramic material from which the ware is fashioned, a profile tool for co-operation with said mold, a trimmer, a support therefor, means for actuating said support so as to move said trimmer toward and away from the brim of the ware and means for varying the speed of withdrawal of the trimmer from the work.

25. In a pottery jiggering machine, a rotatable chuck, a plaster mold removably disposed therein and adapted to be charged with plastic ceramic material from which the ware is fashioned, a profile tool for co-operation with said mold, a trimmer, a support therefor, means for actuating said support so as to move said trimmer toward and away from the brim of said ware and adjustable means for predetermining the closest approach of the trimmer to axis of the mold.

26. In a pottery jiggering machine, a rotatable chuck, a plaster mold removably disposed therein and adapted to be charged with plastic ceramic material from which the ware is fashioned, a profile tool for co-operation with said mold, a trimmer, a support therefor, means for actuating said support so as to move said trimmer into and out of engagement with the brim of the ware and adjustable means for predetermining the farthest point of withdrawal of the trimmer from the work.

27. In a pottery jiggering machine, a rotatable chuck, a plaster mold removably disposed therein and adapted to be charged with plastic material from which the ware is fashioned, a profile tool for co-operation with said mold, a trimmer, a support therefor, means for actuating said support so as to move said tool into and out of engagement with the brim of the ware and adjustable means for predetermining the depth to which the trimmer penetrates the work.

28. In a pottery machine, a rotatable chuck, a plaster mold removably disposed therein and adapted to be charged with plastic ceramic material from which the ware is fashioned, a profile tool for co-operation with said mold, a trimmer, means for supporting said trimmer, means for actuating said support so as to move said trimmer into and out of engagement with the brim of the work during a trimming operation, means for varying the closest approach of the trimmer to the axis of the mold and means for varying the angle of presentation of the trimmer to the work.

29. In a pottery jiggering machine, a rotatable chuck, a mold removably disposed in said chuck and adapted to be charged with plastic ceramic material from which the ware is fashioned, a profile tool for co-operation with said mold, a trimmer, a support therefor, means for actuating said support so as to move the trimmer into engagement with the ware and means for causing the trimmer to follow the contour of the mold.

30. In a pottery jiggering machine, a rotatable chuck, a mold removably disposed in said chuck and adapted to be charged with plastic ceramic material from which the ware is fashioned, a profile tool for co-operation with said mold, a trimmer, a support therefor, means for actuating said support so as to move the trimmer into engagement with the ware and means for varying the level of the trimmer during said movement.

31. In a pottery jiggering machine, a rotatable chuck, a mold removably disposed in said chuck and adapted to be charged with plastic ceramic material from which the ware is fashioned, a profile tool for cooperation with said mold, a trimmer, a support therefor, means for actuating said support so as to move the trimmer into engagement with the ware, and means for varying the working position of the trimmer circumferentially of the mold.

32. In a pottery jiggering machine, a rotatable chuck, a mold removably disposed in said chuck and adapted to be charged with plastic ceramic material for jiggering into ware, a profile tool for co-operation with said mold in jiggering the aforesaid ware, a trimming means, a support for said trimming means, and means for varying the working position of the trimming means out or in from the center of the chuck to adapt the trimming means to various diameter molds.

33. In the manufacture of jiggered pottery ware, a method of trimming excess plastic clay from the ware brim which comprises, bringing the mold and ware into engagement with a flexible trimmer one end of which is secured and the other end of which is free to move and shifting the zone of trimming radially of the surface of the mold by continuing to move the mold perpendicularly relative to the secured end of the trimmer after having brought the trimmer into engagement with the work.

34. In a pottery jiggering machine having a relatively rotatable profile and mold chuck for jiggering plastic clay on the molding surface of jigger molds, a trimming tool for removing excess clay from the periphery of the ware, mechanical means for intermittently applying the tool to the periphery of the ware during the jiggering operation and means associated therewith for varying, while in operation, the time of application and withdrawal of the tool.

35. In a pottery jiggering machine having a relatively rotatable profile and mold chuck for jiggering plastic clay on the molding surface of jigger molds, a trimming tool, mechanical means for applying the tool to the edge of the ware during the jiggering operation, means for varying the speed of movement of the tool with relation to the ware, said last named means being adjustable whilst the tool is in operation and means for varying the position of the tool relative to the edge of the ware whilst the tool is in operation.

36. In a pottery jiggering machine having a relatively rotatable profile tool and chuck for jiggering plastic clay on the molding surface of jiggered molds, a trimming tool, mechanical means for applying the tool to the ware, means for automatically varying the working pressure of the tool whilst in operation and means for changing the position of the tool relative to the ware whilst the tool is in operation.

37. In combination with a pottery jiggering apparatus having a relatively rotatable profile tool and mold chuck for cooperation with a jigger mold, a trimmer for removing excess material from the mold incident to the jiggering operation, cam actuated mechanism for moving the tool into and out of engagement with the work and means for adjusting the mechanism whilst in operation to vary the motion of the tool.

38. In combination with apparatus for jiggering pottery ware on jigger molds, means for trimming the brim of the mold of excess clay which comprises a trimmer and a slidably and rotatably mounted holder for said trimmer and a slidably and rotatably mounted support for said holder by means of which the position of the trimming tool relative to the ware may be varied.

WILLIAM J. MILLER.